US012379698B2

(12) United States Patent
Kumashikar et al.

(10) Patent No.: US 12,379,698 B2
(45) Date of Patent: Aug. 5, 2025

(54) SYSTEMS AND METHODS TO REDUCE VOLTAGE GUARDBAND

(71) Applicant: Intel Corporation, Santa Clara, CA (US)

(72) Inventors: Mahesh K. Kumashikar, Bangalore (IN); Md Altaf Hossain, Portland, OR (US); Mahesh A. Iyer, Fremont, CA (US); Yuet Li, Fremont, CA (US); Atul Maheshwari, Portland, OR (US); Ankireddy Nalamalpu, Portland, OR (US)

(73) Assignee: Altera Corporation, San Jose, CA (US)

( * ) Notice: Subject to any disclaimer, the term of this patent is extended or adjusted under 35 U.S.C. 154(b) by 714 days.

(21) Appl. No.: 17/559,360

(22) Filed: Dec. 22, 2021

(65) Prior Publication Data

US 2022/0113694 A1 Apr. 14, 2022

(51) Int. Cl.
*G05B 19/042* (2006.01)

(52) U.S. Cl.
CPC .. *G05B 19/042* (2013.01); *G05B 2219/21155* (2013.01)

(58) Field of Classification Search
CPC ........ G05B 19/042; G05B 2219/21155; G05B 19/05; G06F 30/31; G06F 30/32; G06F 30/33; G06F 30/34; G06F 30/343; G06F 30/367
USPC ......................................................... 716/117
See application file for complete search history.

(56) References Cited

U.S. PATENT DOCUMENTS

| 10,833,679 | B2 | 11/2020 | Clark et al. |
| 2004/0025135 | A1* | 2/2004 | Hart ........................ G06F 30/34 716/113 |
| 2006/0095889 | A1* | 5/2006 | Cote ..................... G06F 30/367 716/112 |
| 2016/0049941 | A1 | 2/2016 | How et al. |
| 2019/0095564 | A1 | 3/2019 | Atsatt |

\* cited by examiner

*Primary Examiner* — Paul Dinh
(74) *Attorney, Agent, or Firm* — Fletcher Yoder, P.C.

(57) ABSTRACT

Systems or methods of the present disclosure may provide efficient power consumption for programmable logic devices based on reducing guardband voltages. A programmable logic device may include circuit monitors to mimic critical paths of an implemented circuit design and generate timing information based on the critical paths. A controller on the programmable logic device may adjust the voltage guardband based on the timing information.

21 Claims, 8 Drawing Sheets

SYSTEMS AND METHODS TO REDUCE VOLTAGE GUARDBAND

BACKGROUND

The present disclosure relates generally to controlling power consumption with respect to different sectors of an integrated circuit. More particularly, the present disclosure relates to using circuit monitors to reduce voltage guardband of a programmable logic device, such as a field programmable gate array (FPGA) device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

An integrated circuit that contains programmable logic fabric provides a highly flexible platform that can be configured after manufacturing with a custom circuit design. The flexibility and variability in the possible designs that may be programmed into this type of integrated circuit, however, also provides for different sectors of the integrated circuit to be used for different purposes and functions. As the integrated circuit is programmed to perform various operations, sectors of the integrated circuit may have a corresponding critical path that is a function of the user's design. As such, managing the power and performance parameters of sectors of different integrated circuits may involve specifically coordinated techniques.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
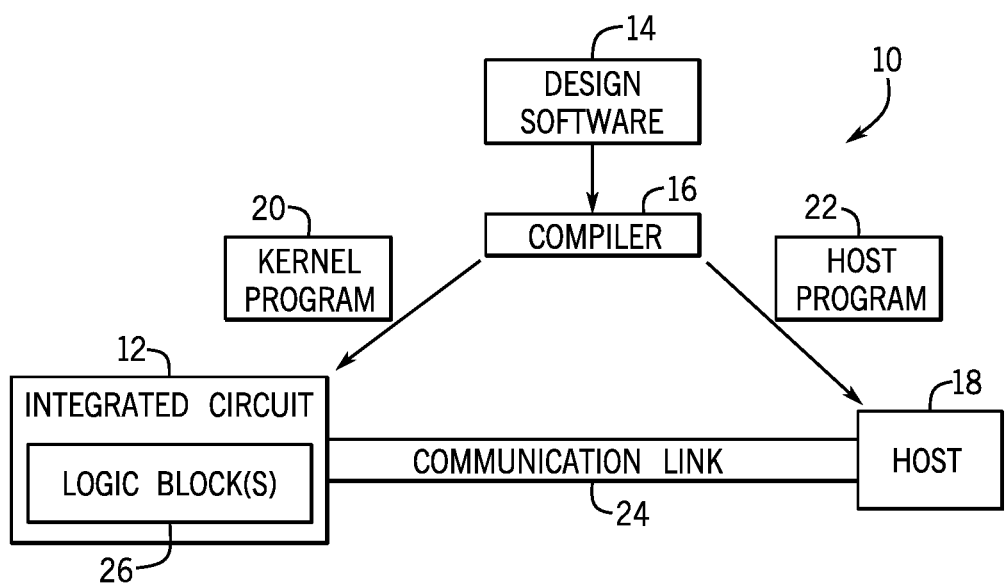
FIG. 1 is a block diagram of a system used to program an integrated circuit, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. The techniques presented and claimed herein are referenced and applied to material objects and concrete examples of a practical nature that demonstrably improve the present technical field and, as such, are not abstract, intangible or purely theoretical.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Programmable logic devices are increasingly permeating markets and are increasingly enabling customers to implement circuit designs in logic fabric (e.g., programmable logic.) Due to the highly customizable nature of programmable logic devices, the logic fabric is to be configured with a circuit design prior to use of the circuit corresponding to the circuit design. When implementing designs in the logic fabric, sectors may be used to allocate portions of the logic fabric to implement the circuit. Because sectors may be employed for different operations, sectors of the programmable logic device may be programmed to use different circuit components (e.g., logic gates) to perform respective operations. As a result, sectors of the programmable logic device may have a different critical path as compared to other sectors. The critical path of a particular sector in the integrated circuit may correspond to the latency of the longest path (e.g., number and delay associated with used circuit components) in performing an operation within the respective sector. Typically, a voltage guardband may be added to an operating voltage of the programmable logic device to ensure proper operation even during voltage drop events. Due to the highly customizable nature of programmable logic devices, a worst-case voltage drop event may be difficult to determine. As such, relatively large guardband voltages may be utilized to provide voltage margin for operation of the programmable logic device. However, unnecessary voltage margins may consume additional power.

Since the critical path of a programmable logic device is not known at the time of manufacture due to the programmability and flexibility provided to users, it may be useful to assess or analyze the critical paths of a user's circuit design after the circuit design is made either before or after it implemented in the logic fabric. To analyze the behavior of critical paths in different sectors of the integrated circuit and to improve the power efficiency and/or performance of a sector of the integrated circuit, a circuit monitor that is utilized to mimic the critical path of the sector may be incorporated into the programmable logic device and used to monitor the user's circuit design as implemented in the programmable logic device. In addition, the circuit monitor may be used to adjust the voltage guardband while the design and/or a sector performs its respective operation(s). That is, a control circuit or the like may monitor the performance of the circuit during the operation of the design and/or sector of the programmable logic device to determine whether at least a portion of the design and/or sector can be operated using less voltage guardband. As a result, at least the portion of the design and/or sector of the programmable logic device may operate at lower voltage guardbands, thereby improving the efficiency in which the programmable logic device operates.

With the foregoing in mind, FIG. 1 illustrates a block diagram of a system 10 that may implement arithmetic operations. A designer may desire to implement functionality, such as the operations of this disclosure, on an integrated circuit 12 (e.g., a programmable logic device, such as a field programmable gate array (FPGA) or an application specific integrated circuit (ASIC)). In some cases, the designer may specify a high-level program to be implemented, such as an OPENCL® program, which may enable the designer to more efficiently and easily provide programming instructions to configure a set of programmable logic cells for the integrated circuit 12 without specific knowledge of low-level hardware description languages (e.g., Verilog or VHDL). For example, since OPENCL® is quite similar to other high-level programming languages, such as C++, designers of programmable logic familiar with such programming languages may have a reduced learning curve than designers that are required to learn unfamiliar low-level hardware description languages to implement new functionalities in the integrated circuit 12.

The designer may implement high-level designs using design software 14, such as a version of INTEL® QUARTUS® by INTEL CORPORATION. The design software 14 may use a compiler 16 to convert the high-level program into a lower-level description. The compiler 16 may provide machine-readable instructions representative of the high-level program to a host 18 and the integrated circuit 12. The host 18 may receive a host program 22 which may be implemented by the kernel programs 20. To implement the host program 22, the host 18 may communicate instructions from the host program 22 to the integrated circuit 12 via a communications link 24, which may be, for example, direct memory access (DMA) communications or peripheral component interconnect express (PCIe) communications. In some embodiments, the kernel programs 20 and the host 18 may enable configuration of a logic block 26 on the integrated circuit 12. The logic block 26 may include circuitry and/or other logic elements and may be configured to implement arithmetic operations, such as addition and multiplication.

In some embodiments, the designer may use the design software 14 to determine a speed of the integrated circuit 12 and/or a sector of the integrated circuit 12, determine a criticality of a path of a design programmed in the integrated circuit and/or a sector of the integrated circuit 12, and the like. The designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, embodiments described herein are intended to be illustrative and not limiting.

Figure 2:
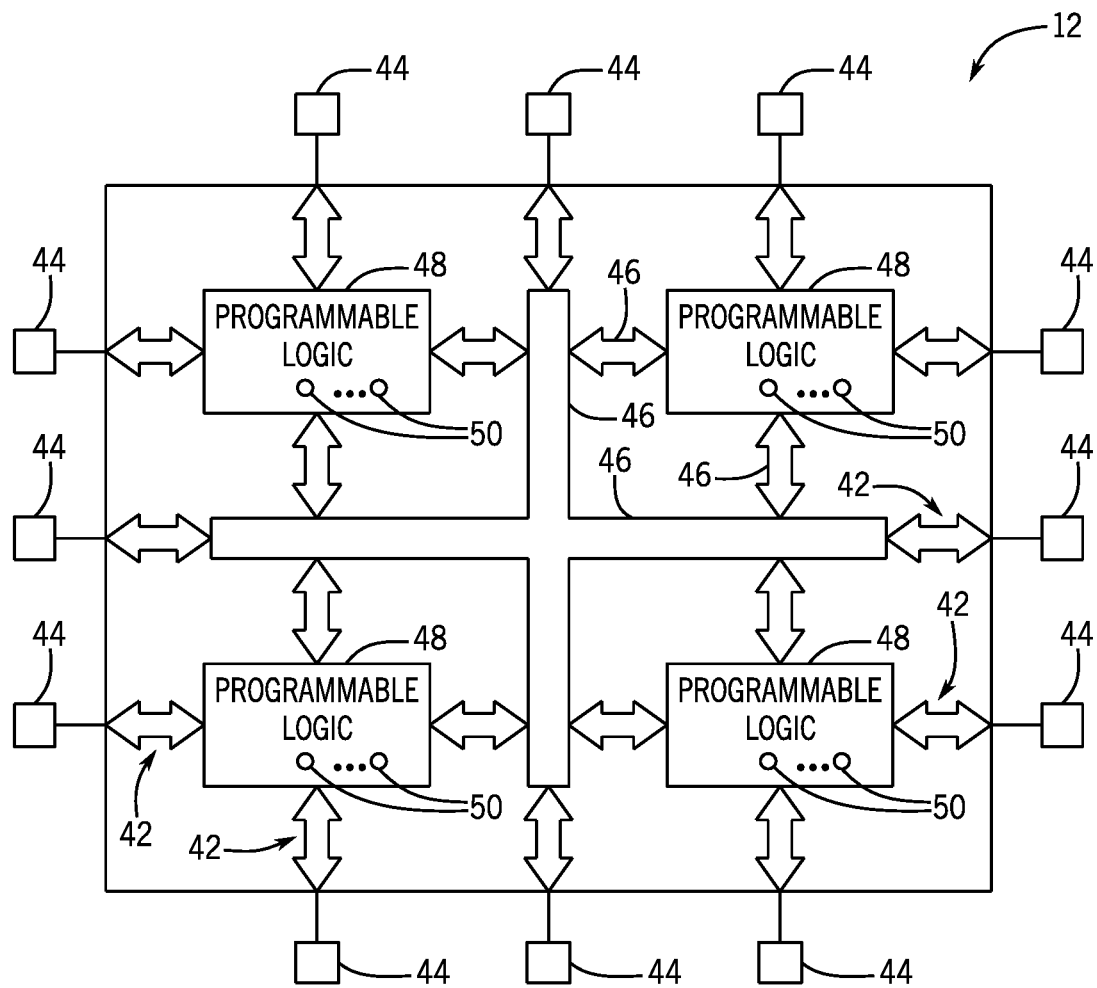
FIG. 2 is a block diagram of the integrated circuit of FIG. 1, in accordance with an embodiment of the present disclosure.

Turning now to a more detailed discussion of the integrated circuit 12, FIG. 2 is a block diagram of an example of the integrated circuit 12 as a programmable logic device, such as a field-programmable gate array (FPGA). Further, it should be understood that the integrated circuit 12 may be any other suitable type of programmable logic device (e.g., an ASIC and/or application-specific standard product). The integrated circuit 12 may have input/output circuitry 42 for driving signals off device and for receiving signals from other devices via input/output pins 44. Interconnection resources 46, such as global and local vertical and horizontal conductive lines and buses, and/or configuration resources (e.g., hardwired couplings, logical couplings not implemented by user logic), may be used to route signals on integrated circuit 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as the integrated circuit 12, may include programmable elements 50 with the programmable logic 48. For example, as discussed above, a designer (e.g., a customer) may (re)program (e.g., (re)configure) the programmable logic 48 to perform one or more desired functions. By way of example, some programmable logic devices may be programmed or reprogrammed by configuring programmable elements 50 using mask programming arrangements, which is performed during semiconductor manufacturing. Other programmable logic devices are configured after semiconductor fabrication operations have been completed, such as by using electrical programming or laser programming to program programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using input/output pins 44 and input/output circuitry 42. In one embodiment, the memory cells may be implemented as random-access-memory (RAM) cells. The use of memory cells based on RAM technology as described herein is intended to be only one example. Further, since these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Keeping the discussion of FIG. 1 and FIG. 2 in mind, a user (e.g., a designer) may utilize the design software 14 to implement the logic block 26 on the programmable logic 48 of the integrated circuit 12. In particular, the designer may specify in a high-level program that mathematical operations such as addition and multiplication be performed. The compiler 16 may convert the high-level program into a lower-level description that is used to program the programmable logic 48 to perform the operations.

Figure 3:
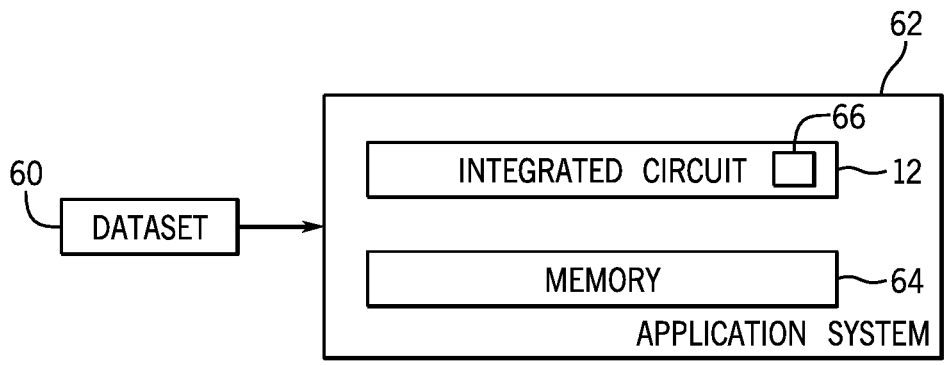
FIG. 3 is a block diagram of an application system that includes the integrated circuit of FIG. 1 and a memory, in accordance with an embodiment of the present disclosure.

Once programmed, the integrated circuit 12 may process a dataset 60, as is shown in FIG. 3. FIG. 3 is a block diagram of an application system 62 that includes the integrated circuit 12 and memory 64. The application system 62 may represent a device that uses the integrated circuit 12 to perform operations based on computational results from the integrated circuit 12, or the like. The integrated circuit 12 may directly receive the dataset 60. The dataset 60 may be stored into the memory 64 before, during, or concurrent to transmission to the integrated circuit 12.

Circuit Monitors to Reduce Voltage Guardband

Figure 4:
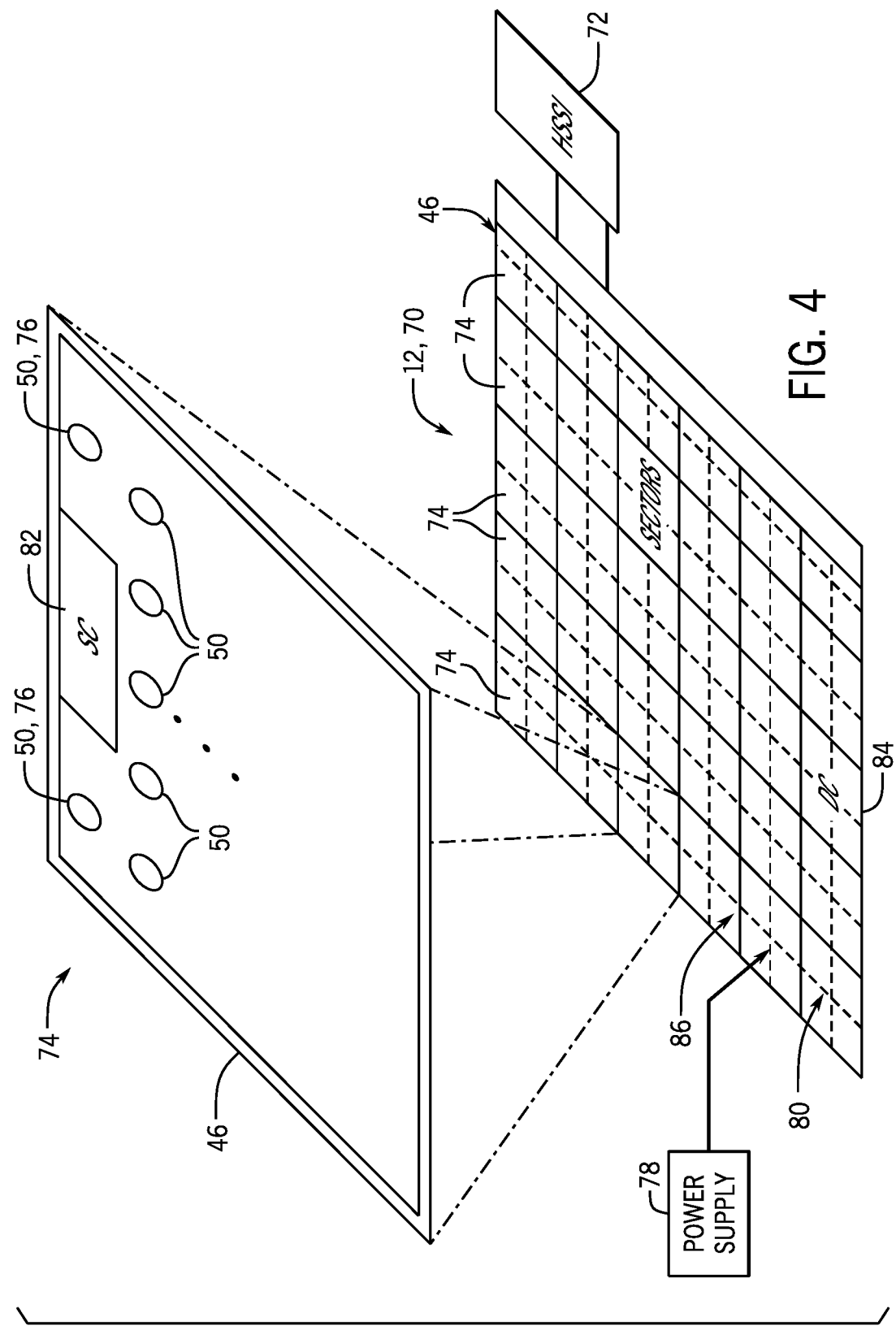
FIG. 4 is a diagram of programmable fabric of the integrated circuit of FIG. 1, in accordance with an embodiment of the present disclosure.

The integrated circuit 12 may include any programmable logic device such as a field programmable gate array (FPGA) 70, as shown in FIG. 4. For the purposes of this example, the FPGA 70 is referred to as an FPGA, though it should be understood that the device may be any suitable type of programmable logic device (e.g., an application-specific integrated circuit and/r application-specific standard product). In one example, the FPGA 70 is a sectorized FPGA of the type described in U.S. Patent Publication No. 2016/0049941, "Programmable Circuit Having Multiple Sectors," which is incorporated by reference in its entirety for all purposes. The FPGA 70 may be formed on a single plane. Additionally or alternatively, the FPGA 70 may be a three-dimensional FPGA having a base die and a fabric die of the type described in U.S. Pat. No. 10,833,679, "Multi-Purpose Interface for Configuration Data and User Fabric Data," which is incorporated by reference in its entirety for all purposes.

In the example of FIG. 4, the FPGA 70 may include transceiver 72 that may include and/or use input/output circuitry, such as input/output circuitry 42 in FIG. 2, for driving signals off the FPGA 70 and for receiving signals from other devices. Interconnection resources 46 may be used to route signals, such as clock or data signals, through the FPGA 70. The FPGA 70 is sectorized, meaning that programmable logic resources may be distributed through a number of discrete programmable logic sectors 74. Programmable logic sectors 74 may include a number of programmable logic elements 50 having operations defined by configuration memory 76 (e.g., CRAM).

A power supply 78 may provide a source of voltage (e.g., supply voltage) and current to a power distribution network (PDN) 80 that distributes electrical power to the various components of the FPGA 70. Operating the circuitry of the FPGA 70 causes power to be drawn from the power distribution network 80.

There may be any suitable number of programmable logic sectors 74 on the FPGA 70. Indeed, while 29 programmable logic sectors 74 are shown here, it should be appreciated that more or fewer may appear in an actual implementation (e.g., in some cases, on the order of 50, 100, 500, 1000, 5000, 10,000, 50,000 or 100,000 sectors or more). Programmable logic sectors 74 may include a sector controller (SC) 82 that controls operation of the programmable logic sector 74. Sector controllers 82 may be in communication with a device controller (DC) 84.

Sector controllers 82 may accept commands and data from the device controller 84 and may read data from and write data into its configuration memory 76 based on control signals from the device controller 84. In addition to these operations, the sector controller 82 may be augmented with numerous additional capabilities. For example, such capabilities may include locally sequencing reads and writes to implement error detection and correction on the configuration memory 76 and sequencing test control signals to effect various test modes.

The sector controllers 82 and the device controller 84 may be implemented as state machines and/or processors. For example, operations of the sector controllers 82 or the device controller 84 may be implemented as a separate routine in a memory containing a control program. This control program memory may be fixed in a read-only memory (ROM) or stored in a writable memory, such as random-access memory (RAM). The ROM may have a size larger than would be used to store only one copy of each routine. This may allow routines to have multiple variants depending on "modes" the local controller may be placed into. When the control program memory is implemented as RAM, the RAM may be written with new routines to implement new operations and functionality into the programmable logic sectors 74. This may provide usable extensibility in an efficient and easily understood way. This may be useful because new commands could bring about large amounts of local activity within the sector at the expense of only a small amount of communication between the device controller 84 and the sector controllers 82.

Sector controllers 82 thus may communicate with the device controller 84, which may coordinate the operations of the sector controllers 82 and convey commands initiated from outside the FPGA 70. To support this communication, the interconnection resources 46 may act as a network between the device controller 84 and sector controllers 82. The interconnection resources 46 may support a wide variety of signals between the device controller 84 and sector controllers 82. In one example, these signals may be transmitted as communication packets.

In some embodiments, the FPGA 70 may include one or more circuit monitors 86 disposed in one or more sectors 74 of the programmable logic. The circuit monitors 86 may mimic one or more critical paths of the implemented circuit design. In some cases, the circuit monitors 86 may be disposed in a portion of unprogrammed logic and/or unused portions of the programmable logic. The circuit monitors 86 may mimic the delay times associated with the critical paths of the implemented circuit design. In certain embodiments, the circuit monitors may be disposed in a portion (e.g., sector 74) of the programmed logic implementing the circuit design. For example, the circuit monitors 86 may include one or more flip-flops to mimic the critical paths and monitor the delay times associated with the critical paths. In some embodiments, the circuit monitors 86 may mimic a portion of the critical path. For example, the flip-flops may be disposed near endpoints of the critical path. Furthermore, although the illustrated embodiment shows a single sector, such monitoring may be similarly made across multiple sectors.

Additionally or alternatively, the circuit monitors 86 may model, match, or emulate timing information (e.g., delays) associated with the critical paths to the sector controller 82. A controller (e.g., the sector controller 82, the device controller 84) may utilize the timing information to adjust the voltage guardband. For example, the controller may determine that the delays are outside of a threshold delay period (e.g., greater than one clock cycle). As such, the controller may adjust the voltage guardband to utilize a higher input voltage without using a worse-case guardband at an even higher voltage. In some cases, the controller may adjust the voltage guardband until the delays are within the threshold delay period. Accordingly, the controller may reduce the power consumption of the integrated circuit 12 based on the timing information utilized by the circuit monitors 86.

The use of configuration memory 76 based on RAM technology as described herein is intended to be only one example. Moreover, configuration memory 76 may be distributed (e.g., as RAM cells) throughout the various programmable logic sectors 74 of the FPGA 70. The configuration memory 76 may provide a corresponding static control output signal that controls the state of an associated programmable logic element 50 or programmable component of the interconnection resources 46. The output signals of the configuration memory 76 may be applied to the gates of metal-oxide-semiconductor (MOS) transistors that control the states of the programmable logic elements 50 or programmable components of the interconnection resources 46.

Figure 5:
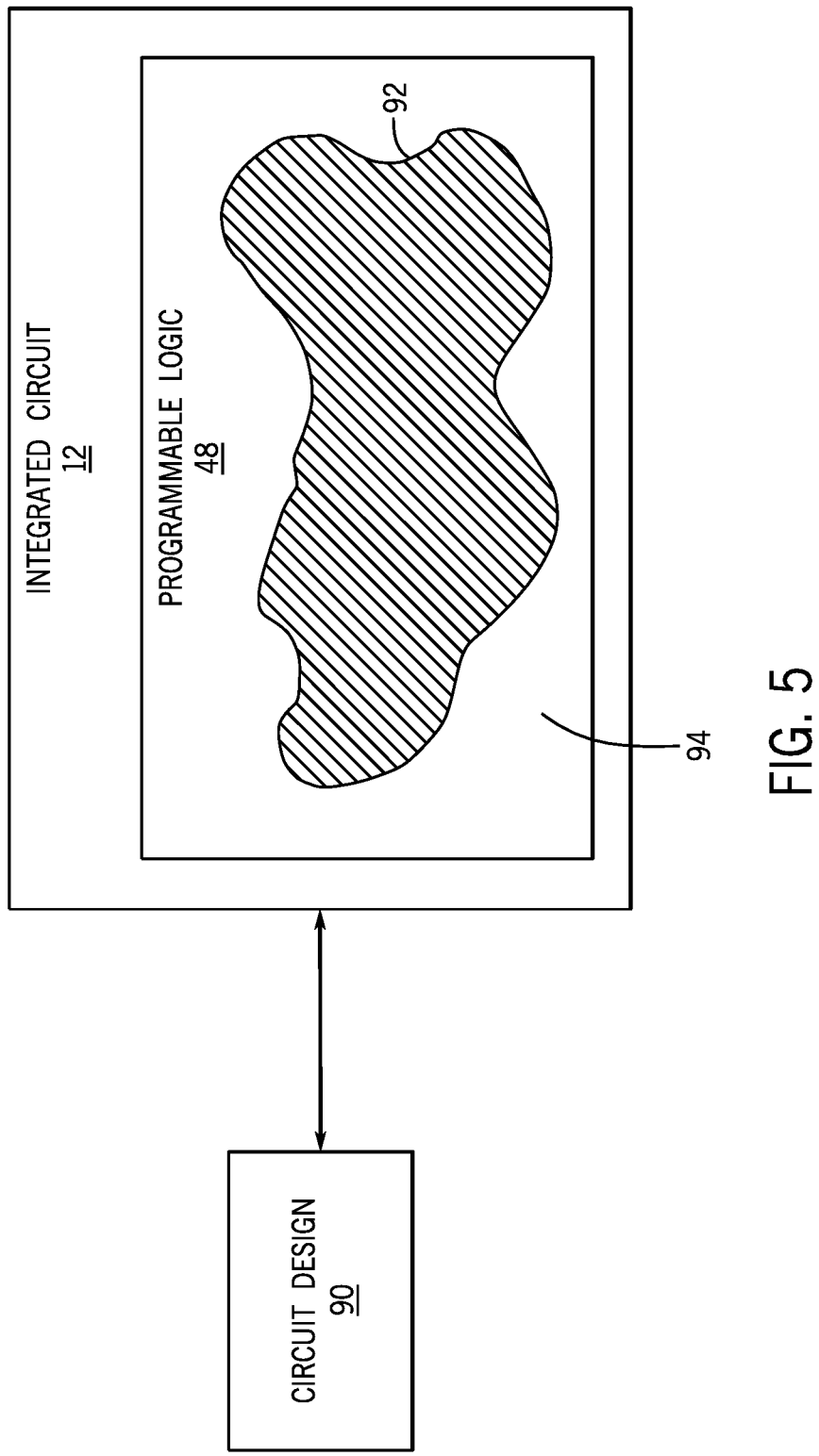
FIG. 5 is a block diagram of a circuit design implemented on the integrated circuit of FIG. 1, in accordance with an embodiment of the present disclosure.

Keeping the foregoing in mind, since programmable logic elements 50 are defined by a user for different integrated circuits 12, the critical paths of a particular programmable logic sector 74 or a collection of programmable logic sectors 74 are defined as a function of the user's circuit design for the integrated circuit 12. Indeed, the critical paths of a user design include a mix of active and passive circuitry and may be affected by thermal hot spots, which may also be part of the user's design of the integrated circuit 12. With the foregoing in mind, FIG. 5 is a block diagram of the integrated circuit 12 programmed with a circuit design 90. Once programmed with the circuit design 90, the integrated circuit 12 may include one or more programmed portions 92 of programmable logic 48 and/or one or more unused (e.g., unprogrammed) portions 94 of programmable logic 48. In some embodiments, the unused portions 94 may be more than half of the programmable logic 48 (e.g., more than 60%, more than 75%, more than 80%, and so forth).

The programmed portions 92 may include one or more critical paths of the circuit design 90. Once the circuit design 90 is completed and/or compiled, the critical paths of the integrated circuit 12 may be identified, by the design software 14, based on an analysis of the circuit design 90. To reduce power consumption of the integrated circuit 12, the unused portions 94 may be utilized to mimic the critical paths of the integrated circuit 12. For example, programmable logic of the unused portions 94 may be utilized to determine an available timing margin of the implemented circuit design 90. For example, the one or more circuit monitors 86 may be implemented in a separate sector 74 than the sectors 74 implementing the circuit design 90. If adequate timing margin exists (e.g., available timing margin exceeds a threshold timing margin), the voltage guardband may be adjusted (e.g., reduced) to decrease power consumption. Additionally or alternatively, the voltage guardband may be adjusted until the available timing margin is within a threshold timing margin.

Figure 6:
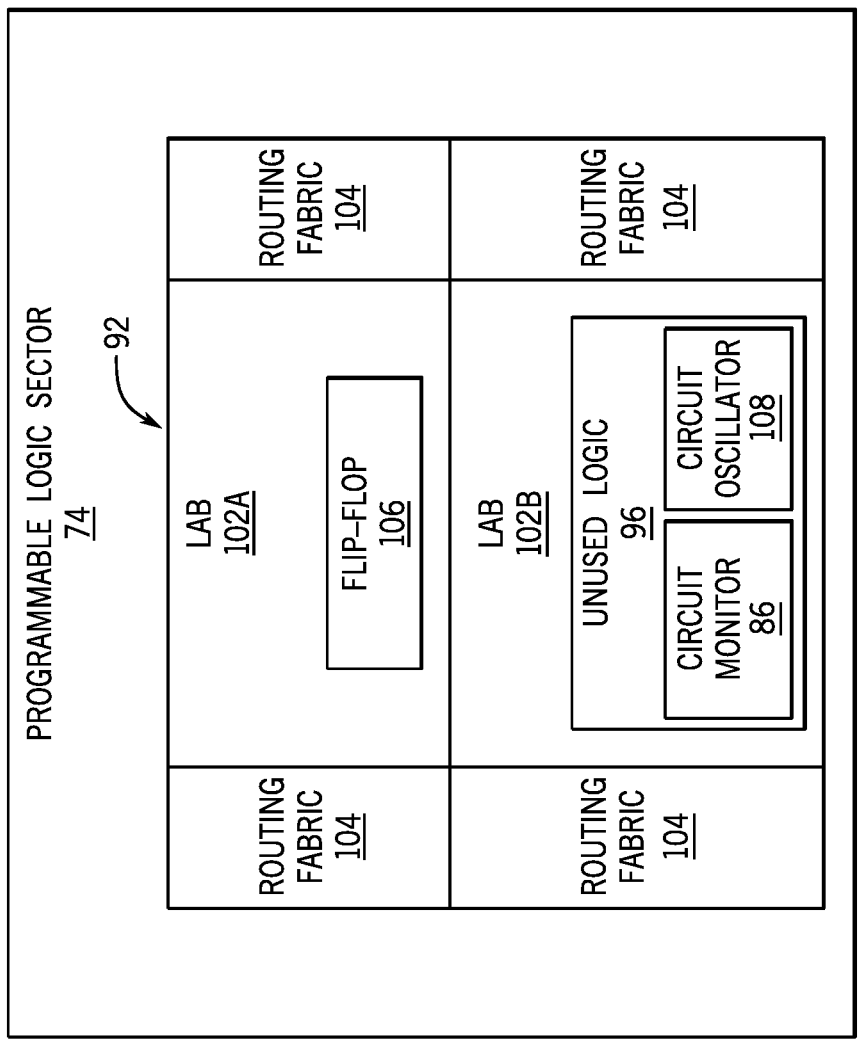
FIG. 6 is a block diagram of a programmable logic sector of the programmable fabric of FIG. 4, in accordance with an embodiment of the present disclosure.

With the foregoing in mind, FIG. 6 is a block diagram of the programmable logic sector 74 including one or more logic array blocks (LABs) 102A, 102B (e.g., two LABs) and the routing fabric 104. The LABs 102A, 102B may be able to interface with the interconnection resources 46. The LABs 102A, 102B may include any number of arithmetic logic element circuitry (ALE) circuits. The LABs 102A, 102B may be separated from one another by routing fabric 104 (e.g., used to access configuration random access memory (CRAM), configuration memory, or other circuitry in the programmable fabric). The programmed portions 92 of programmable logic sector 74 may include the first LAB 102A. In certain embodiments, the first LAB 102A may include a critical path for the implemented circuit design 90. The second LAB 102B may include at least part of the unused portion 94 that may be utilized to implement the circuit monitor 86 that mimics the critical path of the implemented circuit design 90. In some embodiments, the circuit monitor 86 may mimic the entire critical path of the implemented circuit design 90.

Additionally or alternatively, the first LAB 102A may include unutilized components, such as a flip-flop 106. The flip-flop 106 may be disposed in the programmed portion 92 of the programmable logic sector 74. The flip-flop 106 may be disposed near an endpoint of the critical path and may be used to sample, mimic, and/or monitor a portion of the critical path of the implemented circuit design 90. In certain embodiments, multiple flip-flops 106 may be used to sample, mimic, and/or monitor portions of corresponding critical paths of the implemented circuit design 90. Additionally or alternatively, the flip-flop 106 may be disposed adjacent the critical path and/or adjacent any portion of the critical path.

Toggling logic components of the programmable logic 48 between states may reduce the aging and/or the degradation of the programmable logic 48. As such, some portions (e.g., unused portions 94) of the programmable logic 48 that do not toggle may degrade more quickly than portions of the programmable logic 48 that do toggle. Accordingly, aging and/or degradation of unused portions 94 of the programmable logic 48 may be reduced by implementing circuitry to toggle logic components disposed in the unused portions 94. In some embodiments, the programmable logic 48 may include a circuit oscillator 108. For example, the circuit oscillator 108 may be disposed in the unused portion 94 of the programmable logic 48. The circuit oscillator 108 may periodically toggle between states to reduce aging and/or degradation of the unused portion 94 of the programmable logic 48.

Figure 7:
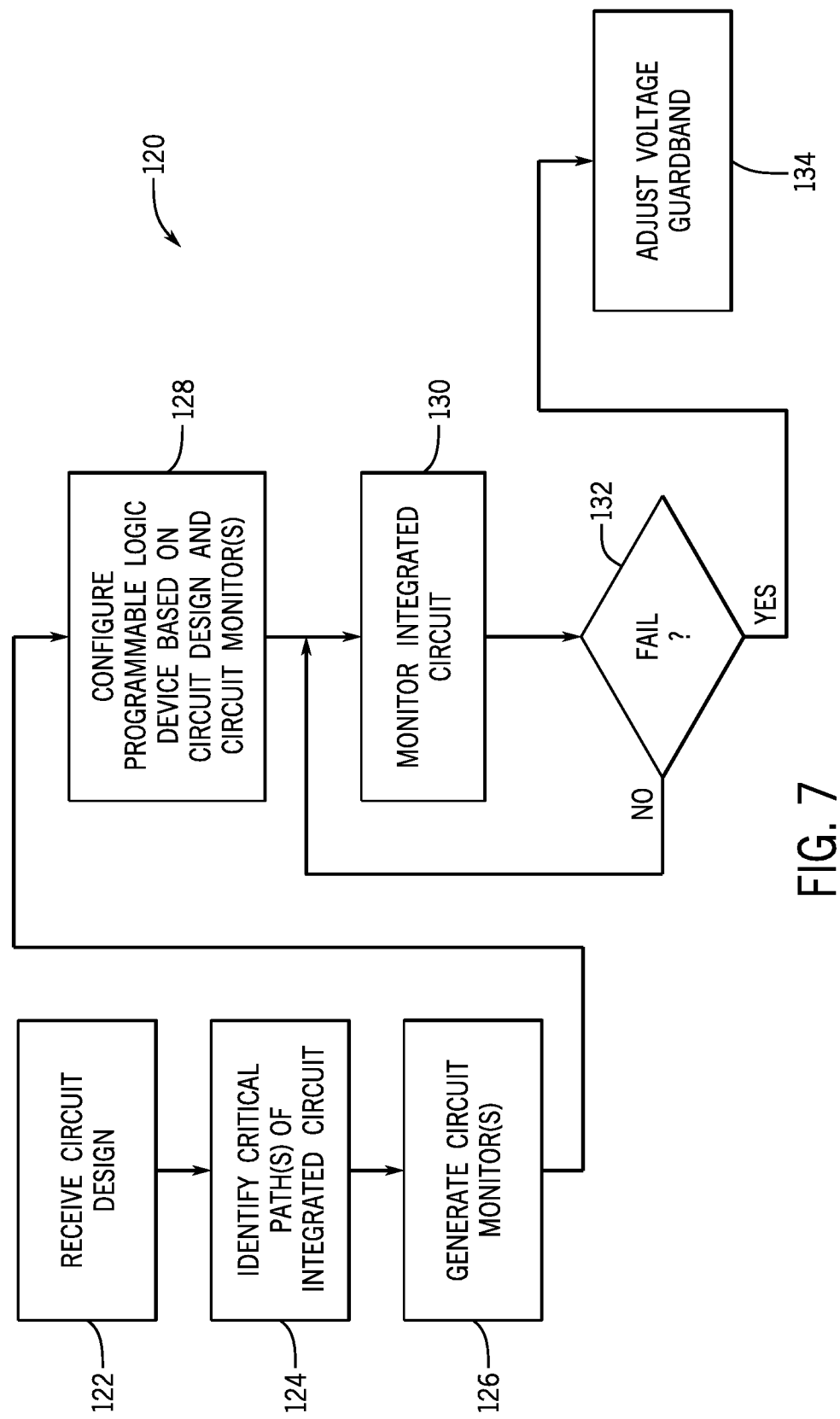
FIG. 7 is a process for adjusting a voltage guardband based on timing information from circuit monitors, in accordance with an embodiment of the present disclosure.

With the foregoing in mind, FIG. 7 illustrates a flow chart of a method 120 for monitoring timing information and adjusting voltage guardband for the integrated circuit 12. For example, the method 120 may be associated with adjusting the voltage guardband based on timing information from circuit monitors 86 as described above. Although the following description of the method 120 is described as being performed by the controller, it should be noted that any suitable processor disposed in or connected to the integrated circuit 12 may perform any operations disclosed as part of the method 120. It should be understood that the method 120 may be performed in any suitable order and should not be limited to the order presented herein.

At block 122, the design software 14 may receive the circuit design 90 to implement in the integrated circuit 12. The circuit design 90 may detail the desired operations and functions of the integrated circuit 12 while the design software 14 may compute and/or implement various circuits based on the circuit design.

Based on the circuit design, the design software 14 may analyze the computed design for the corresponding programmed integrated circuit 12 to identify (block 124) one or more critical paths that may be part of the integrated circuit 12 when configured to implement the design. In certain embodiments, the design software 14 may identify the critical paths in one or more sectors 74 of the design of the integrated circuit 12.

Additionally or alternatively, based on the circuit design, the design software 14 may analyze the corresponding programmed integrated circuit 12 to identify unused portions 94 of programmable logic 48. In certain embodiments, the design software 14 may identify the unused portions 94 in one or more sectors 74 of the integrated circuit 12.

Based on the identified critical paths and/or the identified unused portions 94 of programmable logic 48, the design software 14 may generate (block 126) one or more circuit monitors 86 to mimic at least a portion of the critical paths. As discussed above, unused portions 94 of the programmable logic 48 may be utilized to implement the circuit monitors 86. Additionally or alternatively, programmed portions 92 (e.g., flip-flops 106) may be utilized to implement the circuit monitors 86 near endpoints of the critical paths. Additionally or alternatively, the design software 14 may determine unused portions 94 of the programmable logic 48 to implement the circuit monitors 86.

At block 128, the host 18 may configure the programmable logic 48 based on the circuit design 90 and the circuit monitors 86. The circuit monitors 86 may generate timing information based on the critical paths and the operation of the integrated circuit 12 may be monitored (block 130). For example, the controller may monitor the operation of the integrated circuit 12 and may determine whether failure occurs (block 132). The controller may determine that the integrated circuit 12 has failed or is approaching failure. In certain embodiments, the controller may maintain the voltage guardband at a minimum threshold voltage guardband based on the timing of the mimicked critical paths. For example, the controller may receive timing information from the circuit monitors 86 and may determine that the timing margins fall below a threshold delay. Accordingly, the controller may determine that the operation of the integrated circuit 12 has failed or is approaching failure. As such, the controller may adjust (block 134) the voltage guardband based on the timing information. For example, the controller may increase the voltage guardband to increase the timing margin of the critical paths of the implemented circuit design 90. By maintaining the voltage guardband at or near a minimum voltage guardband (e.g., failure occurs below the minimum voltage guardband) or at least below a worst-case guardband, the controller may reduce the power consumption of the integrated circuit 12. Additionally or alternatively, the controller may determine that the timing margins fall outside (e.g., above) a threshold delay. Accordingly, the controller may adjust the voltage guardband to reduce the timing margin, thereby reducing the power consumption of the integrated circuit 12.

In some embodiments, the controller may determine that the integrated circuit is approaching failure. For example, the controller may determine that the timing of the critical path is approaching and/or within a minimum threshold delay (e.g., one picosecond, five picoseconds, ten picoseconds) from a required time for data (e.g., signal) arrival. As such, the controller may pre-emptively adjust the voltage guardband to prevent failure of the integrated circuit 12. Accordingly, the integrated circuit device may operate with additional voltage margin. If the integrated circuit has not failed or is not approaching failure (NO path of block 132), the method 120 may return to block 130 to monitor the operation of the integrated circuit 12.

In some cases, one or more circuit oscillators 108 may be implemented in unused portions 94 of the integrated circuit 12. For example, the one or more circuit oscillators 108 may be implemented in a separate sector 74 than the sectors 74 implementing the circuit design 90. The circuit oscillators 108 may toggle to reduce the aging and/or degradation of the programmable logic fabric in the unused portions 94. Additionally or alternatively, the design software 14 may determine portions of the programmable logic 48 that are relatively younger (e.g., less aging, less degradation) than other portions of the programmable logic 48. For example, a first portion of the programmable logic 48 may be a programmed portion 92 of the programmable logic 48. Over time and/or operation of the integrated circuit 12, performance of the programmed portion 92 may degrade more than an unused portion 94 of the programmable logic 48. As such, the integrated circuit 12 may be reconfigured (e.g., reprogrammed) to implement the circuit design 90 in relatively less degraded portions of the programmable logic 48.

Figure 8:
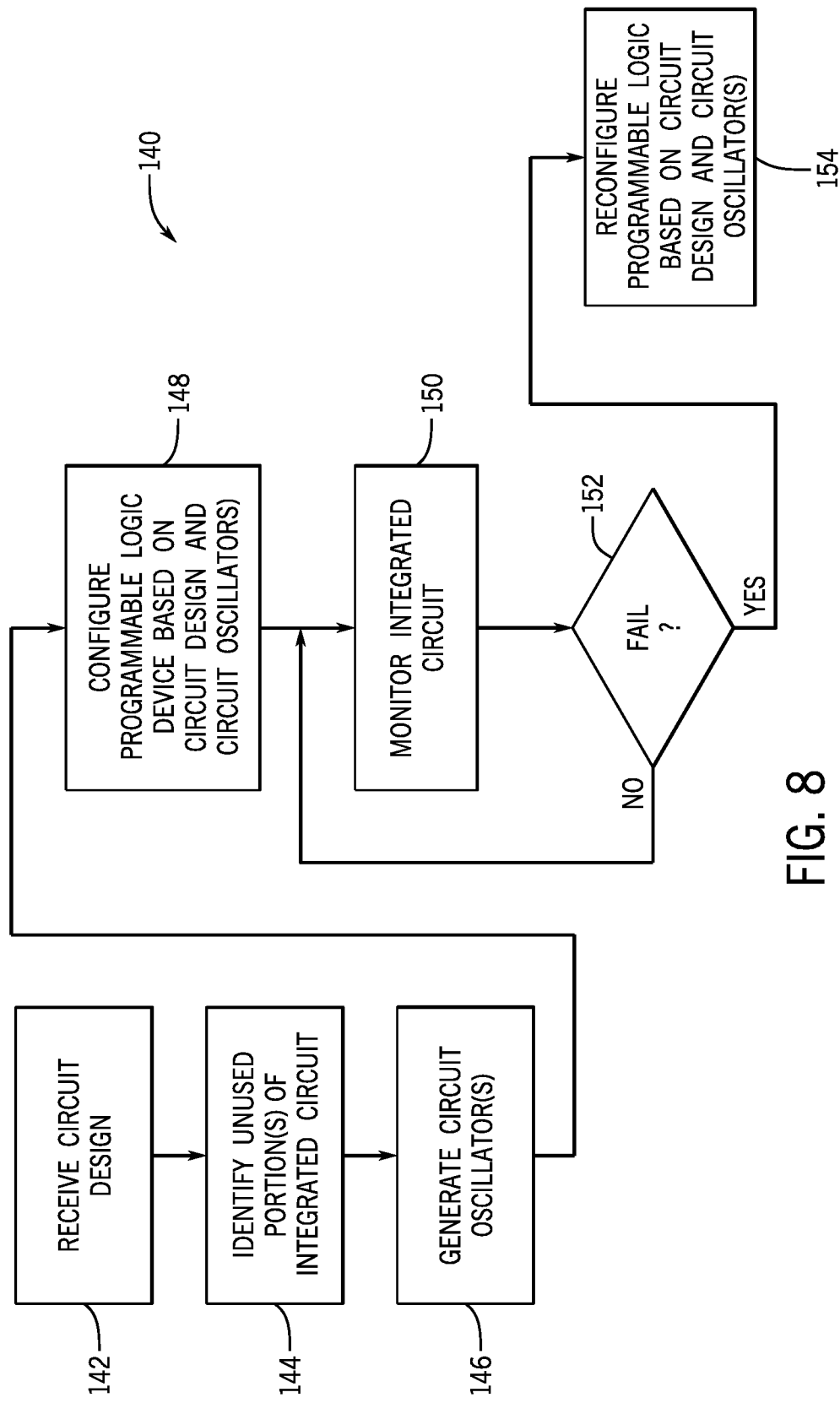
FIG. 8 is a process for reconfiguring a programmable logic device based on previous locations of circuit oscillators, in accordance with an embodiment of the present disclosure.

With the foregoing in mind, FIG. 8 illustrates a flowchart of a method 140 for reconfiguring programmable logic 48 based on aging and/or degradation of portions of the programmable logic 48 for the integrated circuit 12. For example, the method 140 may be associated with adjusting which portion of the programmable logic implements the circuit design 90 based on information from the circuit oscillators 108 as described above. Although the following description of the method 140 is described as being performed by the controller, it should be noted that any suitable processor disposed in the integrated circuit 12 may perform the method 140. It should be understood that the method 140 may be performed in any suitable order and should not be limited to the order presented herein.

At block 142, the design software 14 may receive the circuit design 90 to implement in the integrated circuit 12. The circuit design 90 may detail the desired operations and functions of the integrated circuit 12.

Based on the circuit design, the design software 14 may analyze the corresponding programmed integrated circuit 12 to identify (block 144) unused portions 94 of programmable logic 48. In certain embodiments, the design software 14 may identify the unused portions 94 in one or more sectors 74 of the integrated circuit 12.

Based on the identified unused portions, the design software 14 may generate (block 146) one or more circuit oscillators 108 to implement in the unused portions 94 of the programmable logic 48. As discussed above, the circuit oscillators 108 may operate logic components disposed in the unused portions 94 to switch between states. As such, the circuit oscillators 108 may reduce aging and/or degradation of the unused portions 94 of the programmable logic 48.

At block 148, the host 18 may configure the programmable logic 48 based on the circuit design 90 and the circuit oscillators 108. The circuit oscillators 108 may be implemented in the unused portions 94 of the programmable logic 48. Additionally, the host 18 and/or the design software 14 may store the corresponding portions of the programmable logic 48 where the circuit oscillators 108 are implemented. The controller may monitor (block 150) the operation of the integrated circuit 12 and may determine whether failure occurs (block 152). In some embodiments, the controller may determine that the integrated circuit has failed or is approaching failure. For example, the controller may receive timing information from the circuit monitors 86 and may determine that the timing margins fall below a threshold delay. Accordingly, the controller may determine that the operation of the integrated circuit 12 has failed or is approaching failure. As such, the host 18 may reconfigure (block 154) the programmable logic based on the portions of the programmable logic 48 implementing the circuit oscillators 108. For example, the host 18 may determine that the portions of the programmable logic 48 implementing the circuit oscillators 108 have experienced less degradation (e.g., performance reduction) than the portions of the programmable logic 48 implementing the circuit design 90. This reconfiguration may include a reconfiguration of the entire programmable fabric including a reset of the programmable logic device, a partial reconfiguration during runtime of the programmable logic device, or a combination thereof. Accordingly, the host 18 may reconfigure the programmable logic 48 to implement the circuit design 90 in the relatively less degraded portions of the programmable logic 48. Additionally or alternatively, the host 18 may reconfigure the programmable logic 48 to implement the circuit oscillators 108 in portions of the programmable logic 48 where the circuit design 90 was previously implemented. As such, the circuit oscillators 108 may reduce aging and/or degradation of those portions. If the integrated circuit has not failed or is not approaching failure, the method 140 may return to block 150 to monitor the operation of the integrated circuit 12.

Figure 9:
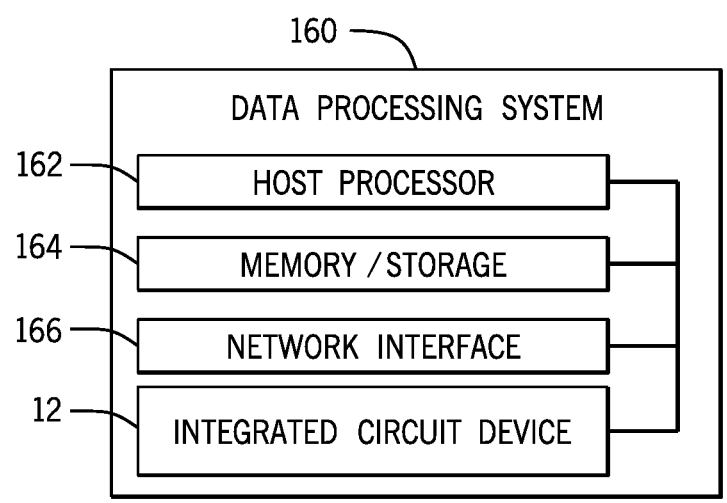
FIG. 9 is a block diagram of a data processing system, in accordance with an embodiment of the present disclosure.

The integrated circuit device 12 may be a data processing system or a component included in a data processing system. For example, the integrated circuit device 12 may be a component of a data processing system 160 shown in FIG. 9. The data processing system 160 may include a host processor 162 (e.g., a central-processing unit (CPU)), memory and/or storage circuitry 164, and a network interface 166. The data processing system 160 may include more or fewer components (e.g., electronic display, user interface structures, application specific integrated circuits (ASICs)). The host processor 162 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 160 (e.g., to perform debugging, data analysis, encryption, decryption, machine learning, video processing, voice recognition, image recognition, data compression, database search ranking, bioinformatics, network security pattern identification, spatial navigation, or the like). The memory and/or storage circuitry 164 may include random access memory (RAM), read-only memory (ROM), one or more hard drives, flash memory, or the like. The memory and/or storage circuitry 164 may hold data to be processed by the data processing system 160. In some cases, the memory and/or storage circuitry 164 may also store configuration programs (bitstreams) for programming the integrated circuit device 12. The network interface 166 may allow the data processing system 160 to communicate with other electronic devices. The data processing system 160 may include several different packages or may be contained within a single package on a single package substrate.

In one example, the data processing system 160 may be part of a data center that processes a variety of different requests. For instance, the data processing system 160 may receive a data processing request via the network interface 166 to perform acceleration, debugging, error detection, data analysis, encryption, decryption, machine learning, video processing, voice recognition, image recognition, data compression, database search ranking, bioinformatics, network security pattern identification, spatial navigation, digital signal processing, or some other specialized task.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

The following numbered embodiments define certain example embodiments of the present disclosure.

EXAMPLE EMBODIMENT 1. A system, comprising: a processor that: receives a circuit design; identifies one or more critical paths based on the circuit design; identifies one or more unused portions of programmable logic of a programmable logic device based on the circuit design; generates one or more circuit monitors that mimic the one or more critical paths; and compiles the circuit design and the one or more circuit monitors into configuration data, wherein the configuration data is transmitted to the programmable logic device; and the programmable logic device comprising a controller that: programs a plurality of programmable logic elements to implement the configuration data, wherein the one or more unused portions of the programmable logic for the circuit design are programmed to implement the one or more circuit monitors; and adjusts a voltage guardband of the programmable logic device based on the one or more circuit monitors.

EXAMPLE EMBODIMENT 2. The system of example embodiment 1, wherein the controller programs the plurality of programmable logic elements to implement a flip-flop to mimic at least a portion of the one or more critical paths.

EXAMPLE EMBODIMENT 3. The system of example embodiment 2, wherein the controller adjusts the voltage guardband based on the flip-flop.

EXAMPLE EMBODIMENT 4. The system of example embodiment 1, wherein the one or more circuit monitors generate timing information associated with the one or more critical paths.

EXAMPLE EMBODIMENT 5. The system of example embodiment 4, wherein the controller: receives the timing information; and adjusts the voltage guardband based on the timing information.

EXAMPLE EMBODIMENT 6. The system of example embodiment 1, wherein the processor generates one or more circuit oscillators that toggle one or more logic components disposed in the one or more unused portions of the programmable logic.

EXAMPLE EMBODIMENT 7. The system of example embodiment 6, wherein the processor compiles the one or more circuit oscillators into the configuration data.

EXAMPLE EMBODIMENT 8. The system of example embodiment 7, wherein the one or more unused portions implement the one or more circuit oscillators.

EXAMPLE EMBODIMENT 9. The system of example embodiment 6, wherein: the controller compiles the one or more circuit oscillators into additional configuration data; and reprograms the plurality of programmable logic elements to implement the additional configuration data.

EXAMPLE EMBODIMENT 10. A programmable logic device, comprising: a first plurality of programmable logic elements that implement a circuit design; a second plurality of programmable logic elements that implements a circuit monitor comprising a flip-flop to monitor at least a portion of a critical path of the circuit design, wherein the circuit monitor generates timing information associated with the critical path; and a controller that: receives the timing information; and adjusts a voltage guardband based on the timing information.

EXAMPLE EMBODIMENT 11. The programmable logic device of example embodiment 10, wherein the controller compares the timing information to a threshold time.

EXAMPLE EMBODIMENT 12. The programmable logic device of example embodiment 11, wherein the controller determines the timing information falls within the threshold time and increases the voltage guardband based on the determination that the timing information falls within the threshold time.

EXAMPLE EMBODIMENT 13. The programmable logic device of example embodiment 10, comprising a third plurality of programmable logic elements that implements an oscillator to toggle logic components of the second plurality of programmable logic elements.

EXAMPLE EMBODIMENT 14. The programmable logic device of example embodiment 13, wherein the oscillator toggles components of the second plurality of programmable logic elements when the first plurality of programmable logic elements or the second plurality of programmable logic elements are not in use to perform an operation.

EXAMPLE EMBODIMENT 15. The programmable logic device of example embodiment 14, wherein the third plurality of programmable logic elements is different from the second plurality of programmable logic elements.

EXAMPLE EMBODIMENT 16. The programmable logic device of example embodiment 10, wherein the first plurality of programmable logic elements is different from the second plurality of programmable logic elements.

EXAMPLE EMBODIMENT 17. A method, comprising: configuring a programmable logic device, comprising: programming a first plurality of programmable logic elements of the programmable logic device to implement a circuit design; and programming a second plurality of programmable logic elements of the programmable logic device to implement a circuit monitor to emulate a critical path in the circuit design; monitoring operation of the programmable logic device using the emulated critical path, wherein monitoring indicates that the first or second plurality of programmable logic elements have aged; and moving the implementation of the circuit design from the first plurality of logic elements to a third plurality of logic elements based on the monitoring.

EXAMPLE EMBODIMENT 18. The method of example embodiment 17, comprising triggering reconfiguration of the programmable logic device based on the monitored operation.

EXAMPLE EMBODIMENT 19. The method of example embodiment 17, comprising adjusting operation of the programmable logic device based on the monitored operation.

EXAMPLE EMBODIMENT 20. The method of example embodiment 19, wherein adjusting operation of the programmable logic device comprises changing a guardband of the programmable logic device.

What is claimed is:

1. A system, comprising:
a processor that:
receives a circuit design;
identifies one or more critical paths based on the circuit design;
identifies one or more unused portions of programmable logic of a programmable logic device based on the circuit design;
generates one or more circuit monitors that mimic the one or more critical paths; and
compiles the circuit design and the one or more circuit monitors into configuration data, wherein the configuration data is transmitted to the programmable logic device; and
the programmable logic device comprising a controller that:
programs a plurality of programmable logic elements to implement the configuration data, wherein the one or more unused portions of the programmable logic for the circuit design are programmed to implement the one or more circuit monitors; and
adjusts a voltage guardband of the programmable logic device based on the one or more circuit monitors.

2. The system of claim 1, wherein the controller programs the plurality of programmable logic elements to implement a flip-flop to mimic at least a portion of the one or more critical paths.

3. The system of claim 2, wherein the controller adjusts the voltage guardband based on the flip-flop.

4. The system of claim 1, wherein the one or more circuit monitors generate timing information associated with the one or more critical paths.

5. The system of claim 4, wherein the controller:
receives the timing information; and
adjusts the voltage guardband based on the timing information.

6. The system of claim 1, wherein the processor generates one or more circuit oscillators that toggle one or more logic components disposed in the one or more unused portions of the programmable logic.

7. The system of claim 6, wherein the processor compiles the one or more circuit oscillators into the configuration data.

8. The system of claim 7, wherein the one or more unused portions implement the one or more circuit oscillators.

9. The system of claim 6, wherein the controller:
compiles the one or more circuit oscillators into additional configuration data; and
reprograms the plurality of programmable logic elements to implement the additional configuration data.

10. A system, comprising:
one or more computer-readable medium storing instructions;
a processor that, when executing first instructions of the instructions, is to:
receive a circuit design;
identify one or more critical paths based on the circuit design;
identify one or more unused portions of programmable logic of a programmable logic device based on the circuit design;
generate one or more circuit monitors that mimic the one or more critical paths; and compile the circuit design and the one or more circuit monitors into configuration data, wherein the configuration data is transmitted to the programmable logic device; and the programmable logic device comprising a plurality of programmable logic elements and a controller that, when executing second instructions of the instructions, is to:

program the plurality of programmable logic elements to implement the configuration data, wherein the one or more unused portions of the programmable logic for the circuit design are programmed to implement the one or more circuit monitors; and adjust a voltage guardband of the programmable logic device based on the one or more circuit monitors.

11. The system of claim 10, wherein the controller, when executing the second instructions, is to program the plurality of programmable logic elements to implement a flip-flop to mimic at least a portion of the one or more critical paths.

12. The system of claim 11, wherein the controller, when executing the second instructions, is to adjust the voltage guardband based on the flip-flop.

13. The system of claim 10, wherein the one or more circuit monitors implemented in the plurality of programmable logic elements generate timing information associated with the one or more critical paths.

14. The system of claim 13, wherein the controller, when executing the second instructions, is to:
receive the timing information; and
adjust the voltage guardband based on the timing information.

15. The system of claim 10, wherein the processor, when executing the first instructions, is to generate one or more circuit oscillators that toggle one or more logic components disposed in the one or more unused portions of the programmable logic.

16. The system of claim 15, wherein the processor, when executing the first instructions, is to compile the one or more circuit oscillators into the configuration data.

17. The system of claim 16, wherein the one or more unused portions implement the one or more circuit oscillators.

18. The system of claim 15, wherein the controller, when executing the second instructions, is to:
compile the one or more circuit oscillators into additional configuration data; and
reprogram the plurality of programmable logic elements to implement the additional configuration data.

19. A method, comprising:
receiving, by a processor, a circuit design;
identifying, by the processor, one or more critical paths based on the circuit design;
identifying, by the processor, one or more unused portions of programmable logic of a programmable logic device based on the circuit design;
generating, by the processor, one or more circuit monitors that mimic the one or more critical paths;
compiling, by the processor, the circuit design and the one or more circuit monitors into configuration data, wherein the configuration data is transmitted to the programmable logic device;
programming, by controller of the programmable logic device, a plurality of programmable logic elements of the programmable logic device to implement the configuration data, wherein the one or more unused portions of the programmable logic for the circuit design are programmed to implement the one or more circuit monitors; and
adjusting, by the controller, a voltage guardband of the programmable logic device based on the one or more circuit monitors.

20. The method of claim 19, comprising:
compiling, by the controller, the one or more circuit monitors into additional configuration data; and
reprogramming, by the controller, the plurality of programmable logic elements to implement the additional configuration data.

21. The method of claim 19, comprising:
programming, by the controller, the plurality of programmable logic elements to implement a flip-flop to mimic at least a portion of the one or more critical paths; and
adjusting, by the controller, the voltage guardband based on the flip-flop.

* * * * *